UNITED STATES PATENT OFFICE.

MARTIN HERZBERG AND FRIEDRICH RUNKEL, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BROWN AZO DYE.

953,035.   Specification of Letters Patent.   Patented Mar. 29, 1910.

No Drawing.   Application filed August 17, 1909.   Serial No. 513,336.

*To all whom it may concern:*

Be it known that we, MARTIN HERZBERG and FRIEDRICH RUNKEL, doctors of philosophy, chemists, citizens of the German Empire, residing at Elberfeld, Germany, have invented new and useful Improvements in Brown Azo Dyes, of which the following is a specification.

This application relates to the manufacture and production of a specific new azo dye which can be obtained by combining in alkaline solution the diazo compound of ortho-aminophenylether sulfonic acid with 2-phenylamino-8-naphthol-6-sulfonic acid, while in a previous application Serial No. 512,891, filed August 14th 1909 we described the whole class to which this specific dye belongs.

The new dyestuff is after being dried and pulverized in the shape of its sodium salt a dark powder soluble in water with a reddish-brown color and soluble in concentrated sulfuric acid with a blue-red color. Upon reduction with stannous chlorid and hydrochloric acid it is decomposed ortho-aminophenylether sulfonic acid and 7-amino-2-phenylamino-8-naphthol-6-sulfonic acid is obtained.

The new coloring matter dyes wool from acid baths brown shades remarkable for their fastness to washing and to milling.

In order to carry out our process we can *e. g.* proceed as follows, the parts being by weight: 26.5 parts of ortho-aminophenylether sulfonic acid are dissolved in hot water with the addition of 6 parts of anhydrous sodium carbonate. 7 parts of sodium nitrite are added and the mixture is introduced into cold water containing 40 parts of crude hydrochloric acid. The diazo compound is introduced into a cold aqueous solution of 31.5 parts of 2-phenylamino-8-naphthol-6-sulfonic acid containing an excess of sodium carbonate. The dyestuff which precipitates is filtered off, washed and dried.

We claim:

The herein described new azo dyestuff obtainable from diazotized ortho-aminophenylether sulfonic acid and 2-phenylamino-8-naphthol-6-sulfonic acid, which dye is after being dried and pulverized in the shape of its sodium salt a dark powder soluble in water with a reddish-brown color and soluble in concentrated sulfuric acid with a blue-red color; yielding upon reduction with stannous chlorid and hydrochloric acid ortho-aminophenylether sulfonic acid and 7-amino-2-phenylamino-8-naphthol-6-sulfonic acid; and dyeing wool brown shades remarkable for their fastness to washing and to milling, substantially as described.

In testimony whereof we have hereunto set our hands in the presence of two subscribing witnesses.

MARTIN HERZBERG. [L. S.]
FRIEDRICH RUNKEL. [L. S.]

Witnesses:
OTTO KÖNIG,
WILLY KLEIN.